US010581272B2

(12) United States Patent
Sankar

(10) Patent No.: US 10,581,272 B2
(45) Date of Patent: Mar. 3, 2020

(54) INPUT POWER APPRAISAL BASED WIRELESS POWER SYSTEM

(71) Applicant: WIPQTUS Inc., Cupertino, CA (US)

(72) Inventor: Ganapathy Sankar, Cupertino, CA (US)

(73) Assignee: WIPQTUS INC., Cupertino, CA (US)

( * ) Notice: Subject to any disclaimer, the term of this patent is extended or adjusted under 35 U.S.C. 154(b) by 516 days.

(21) Appl. No.: 15/253,674

(22) Filed: Aug. 31, 2016

(65) Prior Publication Data

US 2016/0372963 A1 Dec. 22, 2016

Related U.S. Application Data

(63) Continuation-in-part of application No. 13/950,288, filed on Jul. 25, 2013, now Pat. No. 9,467,008.

(60) Provisional application No. 61/676,916, filed on Jul. 28, 2012.

(51) Int. Cl.

| H02J 50/80 | (2016.01) |
|---|---|
| H02J 7/00 | (2006.01) |
| H02J 50/40 | (2016.01) |
| H02J 50/10 | (2016.01) |
| H02J 7/02 | (2016.01) |
| H02J 7/04 | (2006.01) |
| H02J 50/05 | (2016.01) |

(52) U.S. Cl.
CPC ............ *H02J 50/10* (2016.02); *H02J 7/0004* (2013.01); *H02J 7/0027* (2013.01); *H02J 7/025* (2013.01); *H02J 7/045* (2013.01); *H02J 50/05* (2016.02); *H02J 50/40* (2016.02); *H02J 50/80* (2016.02)

(58) Field of Classification Search
CPC ....................................................... H02J 50/10
See application file for complete search history.

(56) References Cited

U.S. PATENT DOCUMENTS

| 9,608,454 B2* | 3/2017 | Sankar | H03H 7/40 |
|---|---|---|---|
| 2009/0322281 A1* | 12/2009 | Kamijo | H02J 5/005 |
| | | | 320/108 |
| 2010/0026236 A1* | 2/2010 | Kamiyama | H02J 7/025 |
| | | | 320/108 |
| 2010/0244579 A1* | 9/2010 | Sogabe | H01F 38/14 |
| | | | 307/104 |
| 2012/0212070 A1* | 8/2012 | Tanabe | H02J 5/005 |
| | | | 307/104 |

(Continued)

Primary Examiner — Jared Fureman
Assistant Examiner — James P Evans

(57) ABSTRACT

A wireless power system (WPS) has a wireless power transmitter (WPT) that appraises an input power available to a power inverter from one or more input power sources. The WPT comprises the power inverter that wirelessly transmits power to a wireless power receiver (WCR) of the WPS, and a power appraiser circuit (PAC). The PAC ascertains maximum input power available to the power inverter from the input power sources. The PAC includes a variable load connected to a path carrying the input power to the power inverter or one or more input pins that receive power ratings of the input power sources that indicate available maximum input power from the input power sources. The ascertaining of maximum input power available to the power inverter from the input power sources appraises the input power available to the power inverter. The WCR receives information representing maximum power deliverable by the WPT.

6 Claims, 6 Drawing Sheets

(56) References Cited

U.S. PATENT DOCUMENTS

| | | | | |
|---|---|---|---|---|
| 2012/0306284 A1* | 12/2012 | Lee | ............ | H02J 17/00 307/104 |
| 2013/0002038 A1* | 1/2013 | Lee | ............ | H02J 7/00 307/104 |
| 2014/0159508 A1* | 6/2014 | Sankar | ............ | H02J 7/025 307/149 |
| 2014/0340033 A1* | 11/2014 | Kim | ............ | H02J 7/025 320/108 |
| 2015/0115730 A1* | 4/2015 | Kanno | ............ | H02J 7/025 307/104 |
| 2016/0181850 A1* | 6/2016 | Toivola | ............ | H02J 7/025 320/108 |
| 2016/0359375 A1* | 12/2016 | Lee | ............ | H02J 50/12 |

* cited by examiner

INPUT POWER APPRAISAL BASED WIRELESS POWER SYSTEM

CROSS REFERENCE TO RELATED APPLICATIONS

This application is a continuation-in-part of application Ser. No. 13/950,288 filed in the United States Patent and Trademark Office on Jul. 25, 2013 which claims benefit from U.S. Provisional Application No. 61/676,916 filed on Jul. 28, 2012.

BACKGROUND

In practical day-to-day wireless charging, there are scenarios where the wireless power transmitter cannot satisfy the power needs of one or more wireless power receivers that are placed on top or in the vicinity of it because of limitations of its input power source. For example, a wireless power transmitter connected to a USB 2.0 port can only draw 2.5 Watts (W) of power from the USB port. A wireless power receiver, external or integrated into an end device such as a smartphone, tablet, etc., may be positioned on top of such a wireless power transmitter to receiver power wirelessly from the wireless power transmitter to charge the end device. During charging, if the wireless power receiver starts drawing (say) 3 W of power, then a system reset will occur as the wireless power receiver's needs cannot be satisfied by the wireless power transmitter which has only 2.5 Watts (W) of power at its disposal from its input power source, the USB 2.0 port. On recovery from reset, the same system behavior repeats—the system resets repeatedly and the wireless power receiver fails to charge the end device. Battery charging of the end device will repeatedly start and stop which has an adverse effect on the reliability and life of the battery. The user experience will be unpleasant and the consumer may steer away from wireless charging as they may not recognize what is causing such an unstable behavior. Besides, there are multiple USB standards, for example, USB 1.0, USB 2.0, and USB 3.0 and each has its own maximum power rating. Depending on the type of USB port, the power rating can vary from 0.5 W, 2.5 W, 4.5 W, etc. As a result, the consumer may be confused and frustrated with varying wireless charging behavior and performance depending on the USB port type into which the wireless power transmitter is plugged in.

Wireless power transfer must be stable for a good end user experience as the stability of the power transfer directly impacts charging time, battery reliability, battery lifetime, etc. The wireless power transfer becomes unstable whenever the wireless power transmitter, by virtue of the limitations of input power source(s), is unable to satisfy the simultaneous dynamic power needs of one or more wireless power receivers placed on top or in the vicinity of the wireless power transmitter. Hence, there is a long felt but unresolved need for a wireless power charging system that overcomes such an unstable power transfer behavior.

SUMMARY OF THE INVENTION

An input power appraisal based wireless power system comprising a wireless power transmitter that appraises an input power available to its power inverter from one or more of multiple input power sources is provided. The wireless power system disclosed herein overcomes unstable power transfer behavior between the wireless power transmitter and the wireless power receiver by determining the maximum power available from each of its one or more of multiple input power sources and then negotiating a sustainable power transfer contract with a wireless power receiver before entering a full power transfer phase. The wireless power transmitter appraises maximum available input power and negotiates a power transfer contract with the wireless power receiver to avoid an unstable power transfer. The wireless power transmitter disclosed herein comprises the power inverter and a power appraiser circuit. The power inverter is configured to wirelessly transmit power to the wireless power receiver of the wireless power system. The power inverter comprises a switch network, a variable matching circuit, a control logic circuit, an ADC, a demodulator circuit and a wireless power transmit interface. The power appraiser circuit is configured to ascertain maximum input power available to the power inverter from the input power sources. The power appraiser circuit comprises a register unit that stores a value indicating the ascertained maximum input power available to the power inverter from each of the power sources. The power appraiser circuit ascertains maximum input power available to the power inverter via a variable load connected to a path carrying the input power to the power inverter. The variable load is configured to vary load characteristic of the path carrying the input power to the power inverter. In an embodiment, a regulator or a switch is operably coupled to the variable load connected to the path carrying the input power to the power inverter. In another embodiment, the power appraiser circuit determines the available maximum input power from the input power sources via one or more input pins configured to receive power ratings of the input power sources. In one approach, the pins are configured with an analog voltage. The power appraiser circuit senses the analog voltage with its ADC and translates that analog voltage to a maximum input power rating via a lookup table, an algorithm, etc. In another approach, the wireless power transmitter interprets and decodes the pins as digital logic levels to ascertain the maximum input power rating of the input power sources. In the third approach, an external controller programs the power appraiser circuit's register unit with the maximum power ratings of the input power sources via those input pins. Ascertaining the maximum input power available to the power inverter from the input power sources appraises the input power available to the power inverter.

At startup, when the wireless power receiver receives initial power, the wireless power receiver provides configuration information such as its maximum output power limit, input power threshold to deliver that maximum output power, etc., via a communication link to the wireless power transmitter. Configuration information such as maximum output power limit and input power threshold represent requirements of the wireless power receiver for the wireless power receiver to operate at its full potential. The wireless power transmitter uses the stored values in the register unit of the power appraiser circuit to select the input power source that can deliver to these requirements of the wireless power receiver. In the first embodiment, the wireless power transmitter selects an input source that satisfies the maximum output power limit of the wireless power receiver. The wireless power transmitter estimates the efficiency of the wireless power system based on its internal configuration information and/or the configuration information from the wireless power receiver. Based on this estimated efficiency and available maximum power of each of the power sources that is stored in the register unit of the power appraiser circuit, the wireless power transmitter selects the input power source(s) that satisfies or is closest to satisfying the maximum output power limit requirement of the wireless power receiver. In the second embodiment, the wireless power transmitter selects an input source that satisfies the input power threshold of the wireless power receiver. In this embodiment, the wireless power transmitter does not estimate the efficiency of the wireless power system. Instead, it estimates its own operating efficiency in conjunction with the wireless power receiver based on its internal configuration information and/or the configuration information from the wireless power receiver. Based on this estimated efficiency and available maximum power of each of the power sources that is stored in the register unit of the power appraiser circuit, the wireless power transmitter selects the input power source(s) that satisfies or is closest to satisfying the input power threshold requirement of the wireless power receiver. If multiple input sources satisfy the wireless power receiver requirement, then the wireless power transmitter selects among the eligible input power sources based of other criteria such as safety. If none of the input sources satisfy the wireless power receiver requirement, then the wireless power transmitter selects the input power source that is closest to satisfying the requirement. Having selected the input power source, the wireless power transmitter sends a message to the wireless power receiver.

The input power appraisal based wireless power system further comprises a wireless power receiver configured to receive an information message from the wireless power transmitter. In the first embodiment, the information message represents the maximum power that the wireless power receiver can deliver to its load. In the second embodiment, the information message represents the maximum power that the wireless power transmitter can deliver to the wireless power receiver. In the second embodiment, based on the information message, the wireless power receiver applies its algorithms to compute the maximum amount of power that it can deliver to its load. The maximum output power limit represents the maximum amount of power that the wireless power receiver can deliver to its load. The wireless power receiver reconfigures its power output circuitry to deliver power at or below this maximum output power limit. The power output circuitry is reconfigured by multiple methods, for example, by adjusting a current limit in regulators or charge management controller operably disposed in the wireless power receiver, limiting a feedback voltage or a duty cycle in the regulators, physically limiting a load operably disposed at the output of the wireless power receiver, etc. The reconfigured power output circuitry delivers power to the load up to the maximum output power limit. In an embodiment, a downstream active load such as a charge management controller is operably coupled to the output of the wireless power receiver disclosed herein. In such a case, the wireless power receiver suitably configures the downstream active load to draw power not exceeding the maximum output power limit of the wireless power receiver.

Disclosed herein is also a method for establishing an optimal power transfer process from the wireless power transmitter to the wireless power receiver. The power appraiser circuit in the wireless power transmitter appraises maximum power capability of each of the input power sources. The wireless power transmitter detects a wireless power receiver proximal to the wireless power transmitter. On detection of the wireless power receiver, the wireless power transmitter transmits a minimum power to the wireless power receiver for powering the wireless power receiver and initiating communication with the wireless power transmitter. Once powered-up, the wireless power receiver communicates configuration information to the wireless power transmitter via a communication link established between the wireless power transmitter and the wireless power receiver.

The wireless power transmitter is aware of the maximum output power limit of the wireless power receiver from the configuration information shared by wireless power receiver. The wireless power transmitter checks the power ratings of the input power sources to identify an input power source that provides sufficient power to the wireless power system to allow the wireless power receiver to deliver power to its load up to its maximum output power limit. On successful identification of such an input power source, the wireless power transmitter transmits an information message indicating the successful match to the wireless power receiver; on receiving this message, the wireless power receiver starts drawing and delivering power up to the configured maximum output power limit. If none of the input power sources can provide sufficient power into the wireless power system, then the wireless power transmitter selects the best input power source that comes closest to satisfying the requirement. Based on the maximum power available from the selected input power source, the wireless power transmitter computes the maximum power deliverable by the wireless power receiver to its load. The wireless power transmitter transmits an information message containing this maximum power value to the wireless power receiver. The wireless power receiver reconfigures the maximum power limit of its power output circuitry to comply with this maximum power value contained in the information message from the wireless power transmitter. After completion of power output circuitry reconfiguration, the wireless power receiver sends an acknowledgement message to the wireless power transmitter. On receiving the acknowledgement, the wireless power transmitter transmits an information message indicating to the wireless power receiver that it can start delivering power within the reconfigured maximum power limit thereby establishing a stable and optimal power transfer phase.

In an embodiment, the wireless power transmitter is aware of the input power threshold of the wireless power receiver from the configuration information shared by wireless power receiver. The input power threshold represents the amount of power that the wireless power receiver needs to receive from the wireless power transmitter for the wireless power receiver to deliver its configured maximum output power to its downstream passive or active load. The wireless power transmitter checks the power ratings of the input power sources to identify an input power source that provides sufficient power to allow the wireless power transmitter to deliver power to the wireless power receiver in excess of the wireless power receiver's input power threshold. On successful identification of such an input power source, the wireless power transmitter transmits an information message indicating the successful match to the wireless power receiver; on receiving this message, the wireless power receiver starts drawing and delivering power up to the configured maximum output power limit. If none of the input power sources can provide sufficient power into the wireless power system, then the wireless power transmitter selects the best input power source that comes closest to satisfying the input power threshold requirement. Based on the maximum power available from the selected input power source, the wireless power transmitter computes the maximum power that it can deliver to the wireless power receiver. The wireless power transmitter transmits an information message containing this maximum input power value to the wireless power receiver. The wireless power receiver computes its maximum output power limit based of the maximum input power value from the information message. The wireless power receiver reconfigures its maximum output power limit of its power output circuitry to comply with this computed maximum power value. After completion of power output circuitry reconfiguration, the wireless power receiver sends an acknowledgement message to the wireless power transmitter. On receiving the acknowledgement, the wireless power transmitter transmits an information message indicating to the wireless power receiver that it can start delivering power within the reconfigured maximum power limit thereby establishing a stable and optimal power transfer phase.

For a period of time following the start of power transfer, the wireless power transmitter actively monitors for unstable power transfer behavior. Depending on various factors such as operating efficiency of the wireless power transmitter and wireless power receiver, positional alignment between the wireless power transmitter's transmit power interface and the wireless receiver's receive power interface, etc., the selected input power source may not yet be able to source sufficient power into the wireless power system for the wireless power receiver to deliver its configured maximum output power to its downstream passive or active load. If there is an unstable power transfer behavior, the wireless power transmitter suitably reduces its efficiency estimates in every pass to yield maximum output power limit and input power threshold values that are lower than those values computed and communicated in the previous pass. With this approach, if ever there were any unstable power transfer behavior, the wireless power transmitter will trap and eliminate such an unstable power transfer behavior right in the initial period of charging. The wireless power system overcomes unstable power transfer behavior by computing, configuring and fine-tuning a sustainable maximum output power limit of the wireless power receiver based of the maximum available power from the wireless power transmitter's input power sources.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1A:
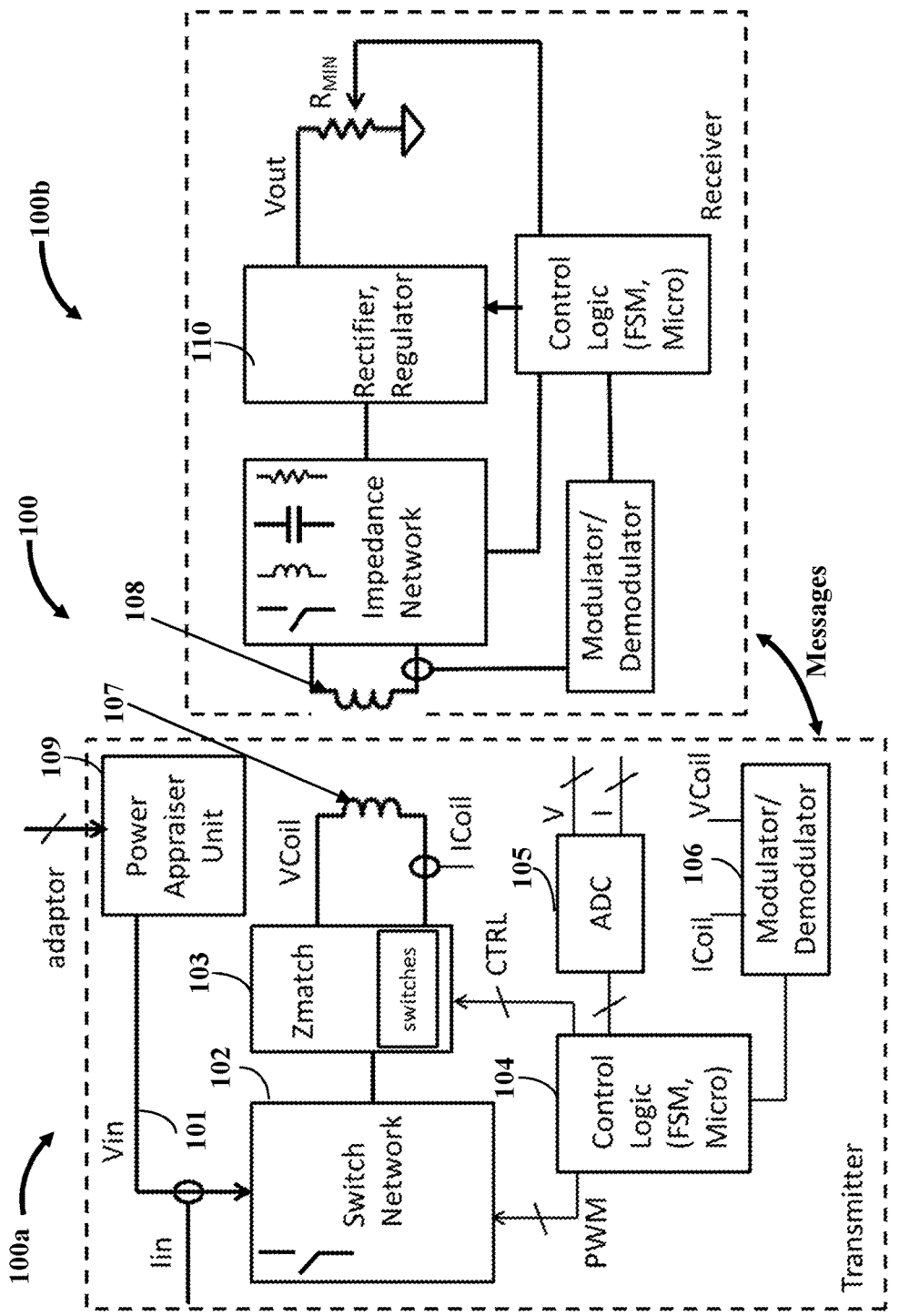
FIG. 1A exemplarily illustrates a schematic diagram of a power appraisal based wireless power charging system, where inductive coupling is used to transmit wireless power through a magnetic field.

FIG. 1A exemplarily illustrates a schematic diagram of an input power appraisal based wireless power charging system 100, where inductive coupling is used to transmit wireless power through a magnetic field. The input power appraisal based wireless power charging system 100 disclosed herein comprises a wireless power transmitter 100a and a wireless power receiver 100b. The wireless power transmitter 100a charges the wireless power receiver 100b. The wireless power transmitter 100a disclosed herein comprises a power inverter, and a power appraiser circuit 109 exemplarily illustrated as a "power appraiser unit" in FIGS. 1A-1B and FIGS. 2A-2D. The wireless power transmitter 100a is configured to appraise an input power available to the power inverter from one or more of multiple input power sources. The power inverter comprises a switch network 102 exemplarily illustrated in FIGS. 1A-1B, a variable matching circuit 103 exemplarily illustrated as a "Zmatch" block in FIGS. 1A-1B, a control logic circuit 104 exemplarily illustrated in FIGS. 1A-1B and FIGS. 2A-2D, a transmit power interface 107 exemplarily illustrated in FIGS. 1A-1B, an ADC circuit 105 exemplarily illustrated in FIGS. 1A-1B and FIGS. 2A-2B and a modulator/demodulator circuit 106 exemplarily illustrated in FIGS. 1A-1B. The variable matching circuit 103 comprises one or more of passive electronic components, for example, a resistor, a capacitor, a magnetic device, a transducer, a transformer, etc.; active electronic components, for example, a diode, a transistor such as a metal oxide semiconductor field effect transistor (MOSFET), a bipolar transistor, etc., operational amplifiers, an optoelectronic device, etc., and electronic switches. These electronic components in combination are utilized to vary impedance of the wireless power transmitter 100a prior to transmitting power to the wireless power receiver 100b.

The switch network 102 is configured to receive an input power and voltage 101 from the power appraiser circuit 109. The variable matching circuit 103 is connected between the switch network 102 and the transmitter power interface 107. In FIG. 1A, the wireless power transmitted to the wireless power receiver 100b is magnetic field based using inductive coupling. The transmitter power interface 107 is a transmitter coil that is configured to wirelessly transmit power to the wireless power receiver 100b. The transmitter coil 107 is used for inducing a magnetic field to a coupling region for providing energy transfer to the wireless power receiver 100b. The wireless power transmitter 100a transmits power to the wireless power receiver 100b by emanating the magnetic field using the transmitter coil 107. The wireless power receiver 100b comprises a receiver coil 108 that picks up the magnetic field with a certain coupling coefficient that exists between the transmitter coil 107 and the receiver coil 108.

The control logic circuit 104 is configured to provide a pulse width modulated (PWM) signal to the switch network 102 to operate the switch network 102 in a frequency regime and/or a duty cycle regime. Analog input signals are converted to digital signals by an analog to digital converter (ADC) 105 operably coupled to the control logic circuit 104 of the wireless power transmitter 100a. The output signal of the ADC 105 is fed to the control logic circuit 104. The modulator/demodulator block 106 senses, filters and decodes messages from the wireless power receiver 100b. The output of the modulator/demodulator block 106 is also fed to the control logic circuit 104. The control logic circuit 104 sends another PWM signal to the modulator/demodulator block 106 for a communication link that exists from the wireless power transmitter 100a to wireless power receiver 100b. The control logic circuit 104 enables or disables electronic components in the variable matching circuit 103 using general purpose input/outputs (GPIOs) and switches. The switch network 102 comprises transistors that are configured to change a state, for example, into an on state or an off state, based on the PWM signal supplied to the switch network 102.

Figure 1B:
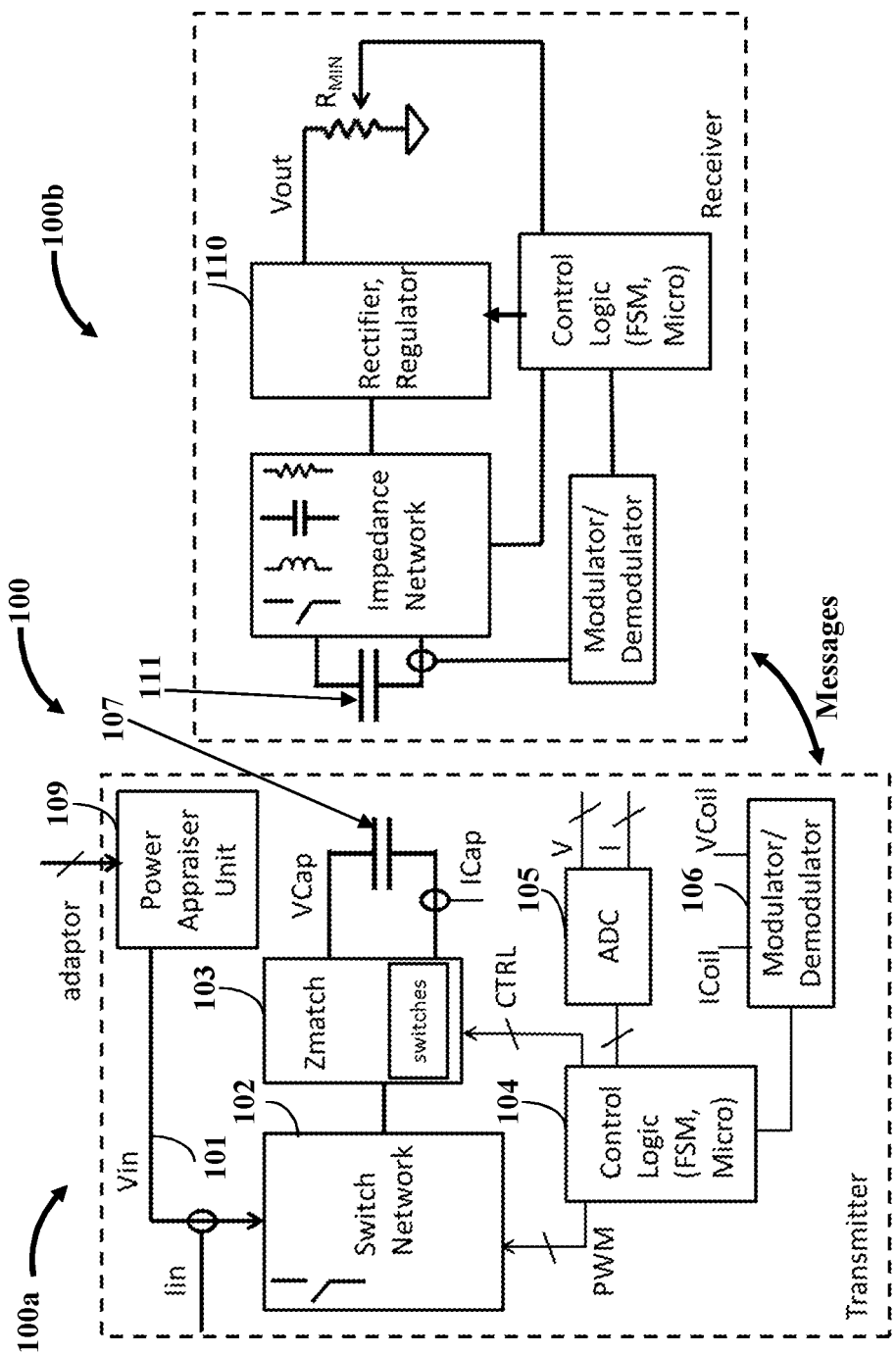
FIG. 1B exemplarily illustrates an embodiment of the power appraisal based wireless power charging system, where capacitive coupling is used to transmit wireless power through an electric field.

FIG. 1B exemplarily illustrates an embodiment of the input power appraisal based wireless power system 100, where capacitive coupling is used to transmit wireless power through an electric field. The wireless power transmitter 100a comprises a power inverter and a power appraiser circuit 109 as disclosed in the detailed description of FIG. 1A. In this embodiment, the power inverter's transmit power interface 107 comprises of one or more capacitors. The power inverter also comprises of a switch network 102, a variable matching circuit 103, a control logic circuit 104, an ADC circuit 105 and a modulator/demodulator circuit 106 as disclosed in the detailed description of FIG. 1A. The variable matching circuit 103 is connected between the switch network 102 and the one or more capacitors of the transmit power interface 107 of the wireless power transmitter 100a. The wireless power transmitted to the wireless power receiver 100b is electric field based using capacitive coupling existing between the capacitor(s) 107 of the wireless power transmitter 100a and the capacitor(s) 111 of the wireless power receiver 100b. The capacitor(s) 107 of the wireless power transmitter 100a is configured to wirelessly transmit power to the wireless power receiver 100b. The capacitor(s) 107 is used for inducing an electric field to a coupling region for providing energy transfer to the wireless power receiver 100b. The wireless power transmitter 100a transmits power to the wireless power receiver 100b by emanating the electric field using the capacitor 107. The capacitor(s) 111 of the wireless power receiver 100b picks up the electric field with a certain coupling coefficient that exists between the capacitor(s) 107 of the wireless power transmitter 100a and the capacitor(s) 111 of the wireless power receiver 100b.

The power appraiser circuit 109 is configured to ascertain maximum input power available to the power inverter by quantifying the maximum available input power to the power inverter from multiple input power sources. Ascertaining the maximum input power available to the power inverter from the input power sources appraises the input power available to the power inverter. Consider an example where the wireless power transmitter 100a is powered up from an input power source of an unknown type and the input power is initially applied to the wireless power transmitter 100a. When the input power is initially applied to the wireless power transmitter 100a, the power appraiser circuit 109 engages and determines the maximum input power available from that power source. The wireless power transmitter 100a switches among its different input power sources using a "make-before-break" switching technique. The "make-before-break" switching technique refers to a configuration in the wireless power transmitter 100a where a new connection path is established before any previous contacts are opened. The power appraiser unit determines the maximum input power available from each of the power sources.

Figure 2A:
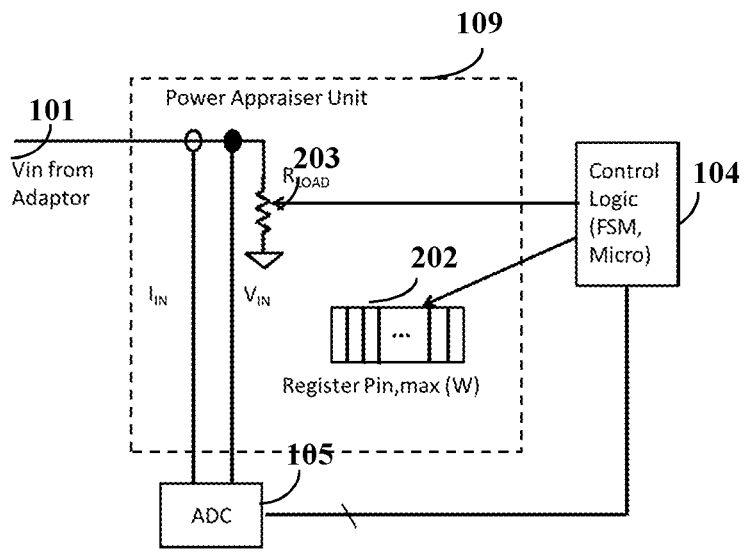
FIG. 2A exemplarily illustrates a first embodiment of the power appraiser circuit of the power appraisal based wireless power transmitter.

FIG. 2A exemplarily illustrates a first embodiment of the power appraiser circuit 109 of the wireless power transmitter 100a. The power appraiser circuit 109 is exemplarily illustrated as a "power appraiser unit" in FIG. 2A. The power appraiser circuit 109 has a variable load 203 exemplarily illustrated as "$R_{LOAD}$" in FIGS. 2A-2B that is controlled by a control logic circuit 104, for example, a state machine, a microcontroller, etc. The variable load 203 is connected to a path carrying the input power to the power inverter. The variable load 203 is configured to vary load characteristics of this path. The variable load $R_{LOAD}$ 203 can be implemented, for example, using resistors, MOSFETs, transistors such as bipolar transistors, duty cycle varied switching, etc. The power appraiser circuit 109 determines the maximum input power available to the power inverter by varying the $R_{LOAD}$ 203 from a high resistance to a low resistance while monitoring the input power which is a product of $I_{IN}$ and $V_{IN}$ sourced from an adaptor. The power appraiser circuit 109 stores a value indicating the maximum input power available from the input power source to the power inverter in a register unit 202, for example, a memory unit. For example, the power appraiser circuit 109, by varying $R_{LOAD}$ 203 between 1 Kilo ohms and 1 ohm, may recognize that the maximum input current that it can draw from an input source of 5 Volts is 1 Ampere. In such a case, the power appraiser circuit 109 would program the register unit 202 element corresponding to the input source with a value of 5 corresponding to 5 Watts.

Figure 2B:
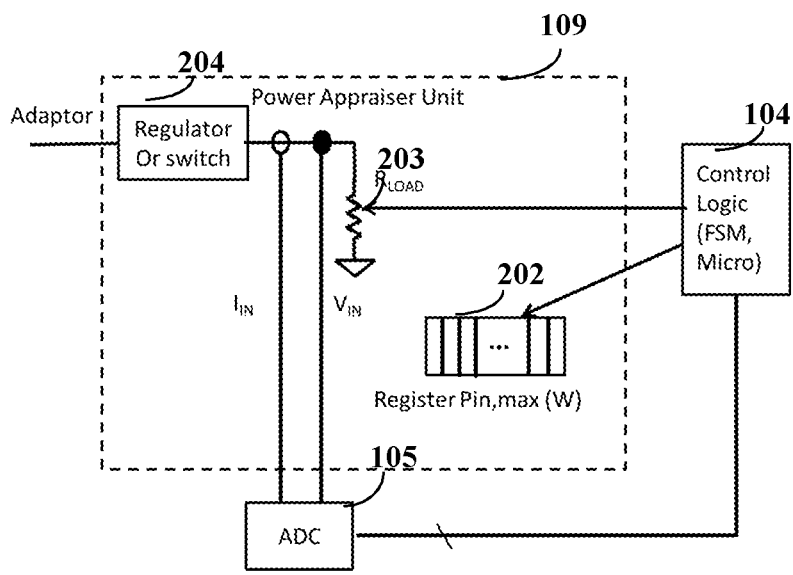
FIG. 2B exemplarily illustrates a second embodiment of the power appraiser circuit of the power appraisal based wireless power transmitter.

FIG. 2B exemplarily illustrates a second embodiment of the power appraiser circuit 109 of the power appraisal based wireless power transmitter 100a. The power appraiser circuit 109 is exemplarily illustrated as a "power appraiser unit" in FIG. 2B. The power appraiser unit has a variable load 203 exemplarily illustrated as "$R_{LOAD}$" in FIGS. 2A-2B, that is controlled by a logic circuit 201, for example, a state machine, a microcontroller, etc. The power appraisal is performed by having an intermediate stage, for example, a regulator or a switch 204 before the point of observation, that is the maximum input power available to the power inverter is measured after regulator or a switch 204. The regulator or the switch 204 is operably coupled to the variable load 203 connected to the path carrying the input power to the power inverter. The regulator maintains a constant input voltage to the variable load 203 and the switch 204 is used to configure a path for the flow of input current. The power appraiser circuit 109 determines the maximum input power available to the power inverter by varying the $R_{LOAD}$ 203, from a high resistance to a low resistance while monitoring the input power which is a product of $I_{IN}$, and $V_{IN}$ sourced from an adaptor.

Figure 2C:
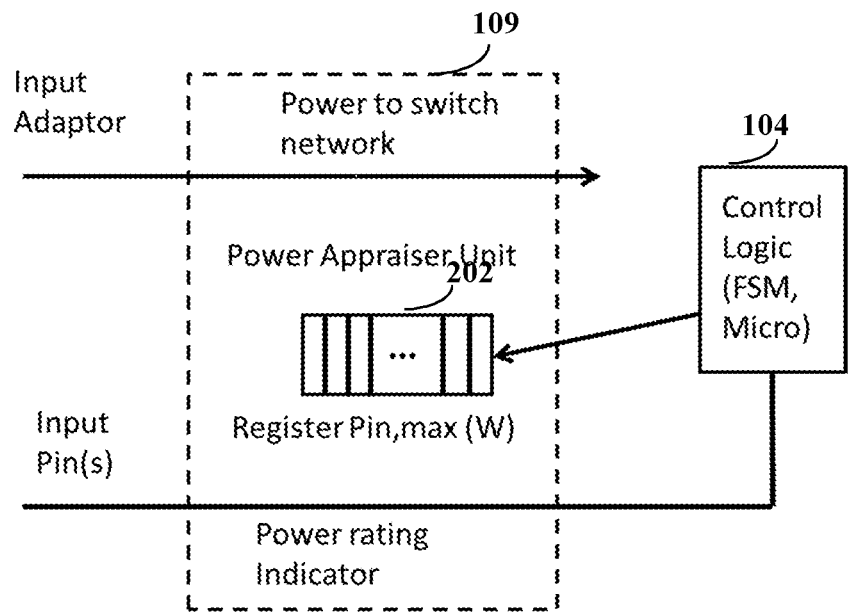
FIG. 2C exemplarily illustrates a third embodiment of the power appraiser circuit of the power appraisal based wireless power transmitter.

FIG. 2C exemplarily illustrates a third embodiment of the power appraiser circuit 109 of the power appraisal based wireless power transmitter 100a. The power appraiser circuit 109 is exemplarily illustrated as a "power appraiser unit" in FIG. 2C. One or more input pins of the power appraiser circuit 109 is configured to receive power ratings of the input power sources that indicate the maximum available power from the input power sources. In the first approach, the power appraisal is performed on the basis of an explicit indication on a separate pin. For example, if the input pin is at a 3.3V TTL logic level 1 (>2.2 Volts), then the maximum available power of the power source associated with the pin may be considered as 10 Watts. If the same input pin was at a 3.3V TTL logic level 0 of (<1.2 Volts), then the maximum available power of the power source associated with the pin may be considered to be 5 Watts. In the second approach, the power appraisal is performed on the basis of decoding the logic levels on multiple input pins associated with the power source. For example, if pinA and pinB are configured with the power rating of the input source X, then if pinA and pinB were both at 3.3V TTL logic level 1 (>2.2 Volts), then the maximum available power of the power source X may be considered 30 W. If pinA and pinB were both at 3.3V TTL logic level 0 (<1.2 Volts), then the maximum available power of the power source X may be considered 3 W. If pinA were at 3.3V TTL logic level 0 and pinB were at 3.3V TTL logic level 1, then the maximum available power of the power source X may be considered 15 W. In the third approach, the maximum available power of the power source(s) is learnt via information provided on the pins by an external controller (not shown) following a protocol such as I2C, SPI, etc. In this approach, the pins may be bi-directional carrying information-requests and information-responses between Control Logic 104 and the external controller. In an embodiment of this approach, power appraisal is initiated by the Control Logic 104 sending a request for the power rating information. The request is as per the protocol implemented on the pins. On receiving the request, the external microcontroller responds with the power rating information. The response is as per the protocol implemented on the pins. The Control Logic 104 extracts the maximum available power values of the input source(s) from the response and stores them in the register unit 202 of the power appraiser circuit 109.

Figure 2D:
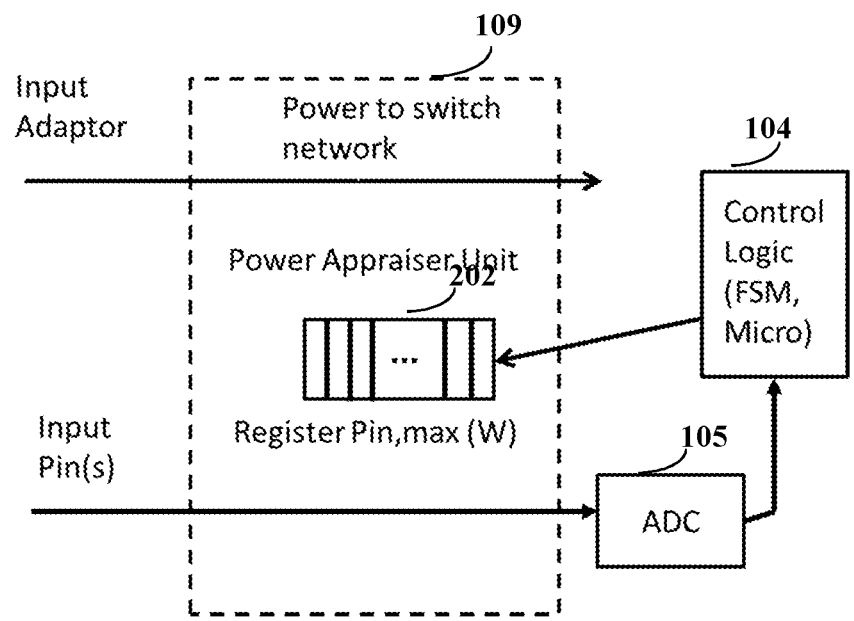
FIG. 2D exemplarily illustrates a fourth embodiment of the power appraiser circuit of the power appraisal based wireless power transmitter.

FIG. 2D exemplarily illustrates a fourth embodiment of the power appraiser circuit 109 of the power appraisal based wireless power transmitter 100a. The power appraiser circuit 109 is exemplarily illustrated as a "power appraiser unit" in FIG. 2D. One or more input pins of the power appraiser circuit 109 is configured to receive power ratings of the input power sources that indicate the maximum available power from the input power sources. In this embodiment, the input pins are configured with an analog voltage. Power appraisal is performed by ADC 105 sensing the analog voltage and Control Logic 104 translating the digital output of the ADC 105 to the power rating of the input source via a lookup table, an algorithm, etc. For example, if the analog voltage on the input pin was 1.6V, the ADC 105 may generate a digital code (say)0x0F which the Control Logic 104 looks up in its memory to determine the maximum available power of the power source as 16 Watts.

Figure 3:
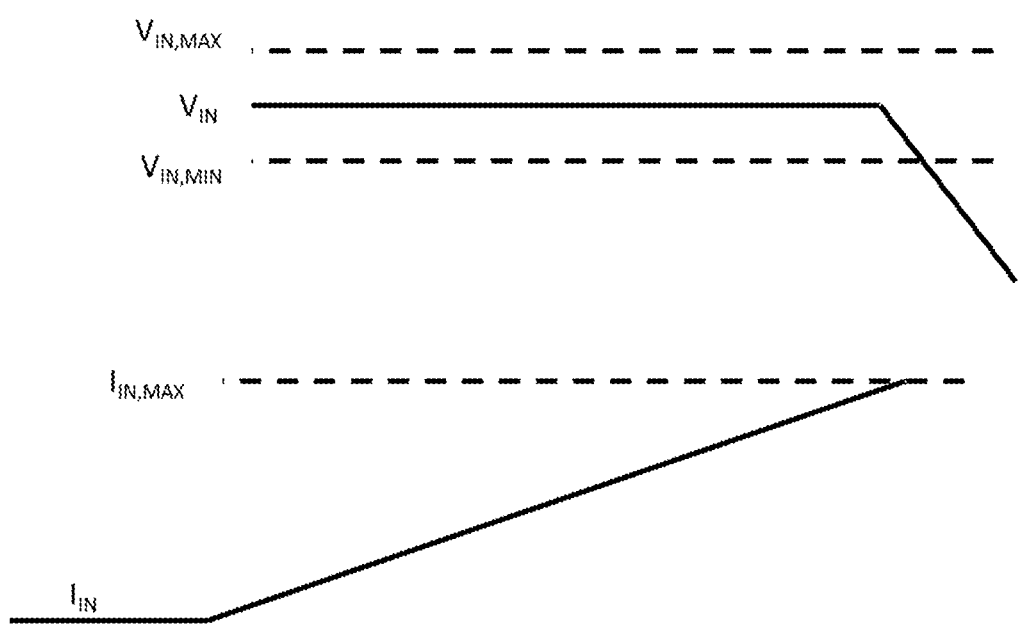
FIG. 3 exemplarily illustrates a graphical representation showing a variation in an input voltage and an input current as a load is varied in the power appraiser circuit.

FIG. 3 exemplarily illustrates a graphical representation showing a variation in an input voltage and an input current as a load is varied in the power appraiser circuit 109. The maximum input power available to the power inverter, $P_{IN, MAX}$ is approximated to be a product of $I_{IN, MAX}$ and $V_{IN, MIN}$, that is $I_{IN, MAX} * V_{IN, MIN}$.

At startup, when the wireless power receiver 100b receives initial power, the wireless power receiver 100b provides configuration information such as its maximum output power limit, input power threshold to deliver that maximum output power, etc., via a communication link to the wireless power transmitter 100a. Configuration information such as maximum output power limit and input power threshold represent requirements of the wireless power receiver 100b for the wireless power receiver 100b to operate at its full potential. The wireless power transmitter 100a uses the stored values in the register unit 202 of the power appraiser circuit 109 to select the input power source that can deliver to these requirements of the wireless power receiver 100b. In the first embodiment, the wireless power transmitter 100a selects an input source that satisfies the maximum output power limit of the wireless power receiver 100b. The wireless power transmitter 100a estimates the efficiency of the wireless power system based on its internal configuration information and/or the configuration information from the wireless power receiver 100b. Based on this estimated efficiency and available maximum power of each of the power sources that is stored in the register unit 202 of the power appraiser circuit 109, the wireless power transmitter 100a selects the input power source(s) that satisfies or is closest to satisfying the maximum output power limit requirement of the wireless power receiver 100b. For example, if the estimated system efficiency is 50% and maximum output power limit requirement of the wireless power receiver 100b is 5 Watts, then among 3 input power source each providing 2.5 Watts, 5 Watts and 10 Watts of power, the wireless power transmitter 100a selects the power source that provides 10 Watts as only that power source can satisfy 50%*10 Watts=5 Watts) the maximum output power limit requirement of the wireless power receiver 100b. In the second embodiment, the wireless power transmitter 100a selects an input source that satisfies the input power threshold of the wireless power receiver 100b. In this embodiment, the wireless power transmitter 100a does not estimate the efficiency of the wireless power system. Instead, it estimates its own operating efficiency in conjunction with the wireless power receiver 100b based on its internal configuration information and/or the configuration information from the wireless power receiver 100b. Based on this estimated efficiency and available maximum power of each of the power sources that is stored in the register unit 202 of the power appraiser circuit 109, the wireless power transmitter 100a selects the input power source(s) that satisfies or is closest to satisfying the input power threshold requirement of the wireless power receiver 100b. For example, if the wireless power transmitter's operating efficiency is 90% and the input power threshold requirement of the wireless power receiver 100b is 8 Watts, then among 3 input power source providing 2.5 Watts, 5 Watts and 10 Watts of power each, the wireless power transmitter 100a selects the power source that provides 10 Watts as only that power source can satisfy (90%*10 Watts=9 Watts) the input power threshold requirement of the wireless power receiver 100b. If multiple input sources satisfy the wireless power receiver 100b requirement, then the wireless power transmitter 100a selects among the eligible input power sources based of other criteria such as safety. If none of the input sources satisfy the wireless power receiver 100b requirement, then the wireless power transmitter 100a selects the input power source that is closest to satisfying the requirement. For example, if the wireless power transmitter's operating efficiency is 90% and the input power threshold requirement of the wireless power receiver 100b is 5 Watts, then among 2 input power source providing 2.5 Watts and 5 Watts of power each, the wireless power transmitter 100a selects the power source that provides 5 Watts as that power source is closest (90%*5 Watts=4 Watts) to satisfying the input power threshold requirement of the wireless power receiver 100b. Having selected the input power source, the wireless power transmitter 100a sends message to the wireless power receiver 100b as per the flow exemplarily described in FIG. 4.

The input power appraisal based wireless power system 100 further comprises a wireless power receiver 100b exemplarily illustrated in FIGS. 1A-1B, configured to receive an information message from the wireless power transmitter 100a. In the first embodiment, the information message represents the maximum power that the wireless power receiver 100b can deliver to its load. In the second embodiment, the information message represents the maximum power that the wireless power transmitter 100a can deliver to the wireless power receiver 100b. In the second embodiment, based on the information message, the wireless power receiver 100b applies its algorithms to compute the maximum amount of power that it can deliver to its load. The maximum amount of power that the wireless power receiver 100b can deliver to its load is its maximum output power limit. The wireless power receiver 100b reconfigures its power output circuitry to deliver power at or below this maximum output power limit. The power output circuitry is reconfigured by multiple methods, for example, by adjusting a current limit in regulators 110 or the constant current mode (CC mode) limit of integrated charge management controller 110 operably disposed in the wireless power receiver 100b, limiting a feedback voltage or a duty cycle in the regulators 110, physically limiting a load operably disposed at the output of the wireless power receiver 100b, etc. The reconfigured power output circuitry delivers power to the load up to the maximum output power limit.

In an embodiment, a downstream active load such as a charge management controller or a charge management integrated circuit (CMIC) may be operably coupled to the output of the wireless power receiver 100b disclosed herein. In such a case, the wireless power receiver 100b suitably configures the downstream active load to draw power up to the maximum output power limit of the wireless power receiver 100b. In a typical scenario where a CMIC is drawing power from the wireless power receiver 100b, the wireless power receiver 100b adjusts the constant current mode (CC mode) limit of CMIC. As an example, if the wireless power transmitter 100a sends the maximum output power limit as 10 Watts, then wireless power receiver 100b with a Voltage Output (Vout) of 10V would program its regulator's current limit and the CMIC's CC mode limit to 1 Ampere. The wireless power receiver 100b may be connected to other types of loads, for example, buck, boost, flyback, low-dropout (LDO), etc., and the wireless power receiver 100b configures the load not to draw power beyond the new maximum output power limit by adjusting the current limits of these loads, limiting duty cycle of a regulator, limiting a feedback voltage in a feedback path of the regulator, etc.

Figure 4:
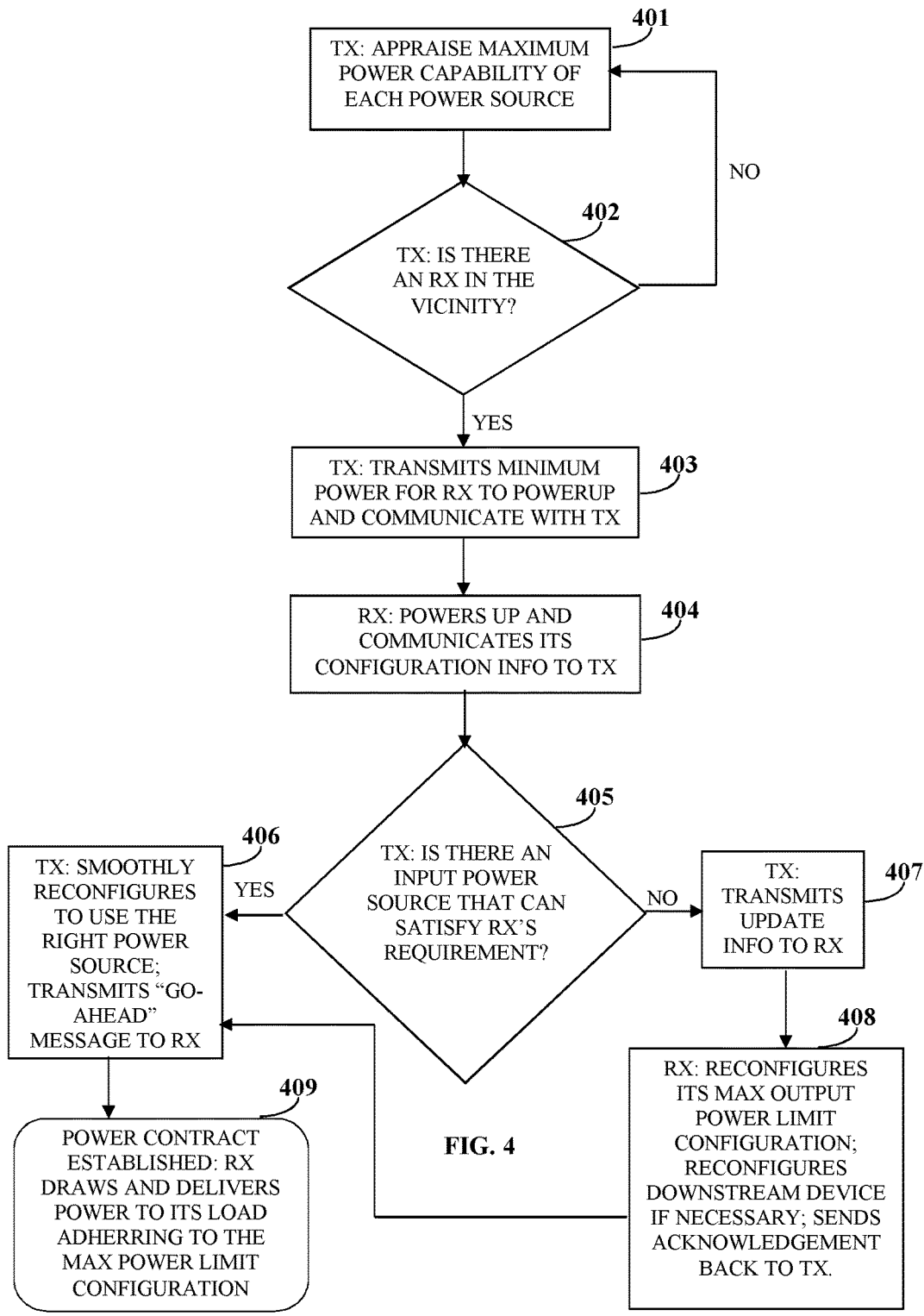
FIG. 4 exemplarily illustrates a flow chart comprising the steps for establishing a stable and optimal power transfer from the wireless power transmitter to the wireless power receiver.

FIG. 4 exemplarily illustrates a flow chart comprising the steps for establishing a stable and optimal power transfer from the wireless power transmitter 100a to the wireless power receiver 100b shown in FIGS. 1A-1B. The power transfer process comprises negotiating a power transfer contract between the wireless power transmitter 100a and the wireless power receiver 100b to avoid unstable power transfer. The power appraiser circuit 109 appraises 401 maximum power capability of each of the input power sources. At startup, the power appraiser circuit 109 of the wireless power transmitter 100a ascertains the maximum available input power as disclosed in the detailed description of FIGS. 2A-2D, from each of the input power sources that are available to the wireless power transmitter 100a to draw power from. The wireless power transmitter 100a detects 402 a wireless power receiver 100b proximal to the wireless power transmitter 100a. That is, after completion of the power appraisal, the wireless power transmitter 100a checks continuously for a wireless power receiver 100b in its close proximity or environment. The wireless power transmitter 100a, on detecting the wireless power receiver 100b, transmits 403 a minimum power to the detected wireless power receiver 100b for powering the wireless power receiver 100b and initiating communication with the wireless power transmitter 100a. The wireless power receiver 100b powers up 404 to communicate configuration information, for example, wireless charger receiver identification, its maximum output power limit, input power threshold to deliver that maximum output power, etc., of the wireless power receiver 100b, etc., to the wireless power transmitter 100a via a communication link established between the wireless power receiver 100b and the wireless power transmitter 100a. Configuration information such as maximum output power limit and input power threshold represent requirements of the wireless power receiver 100b for the wireless power receiver 100b to operate at its full potential. These requirements are henceforth referred to as optimal operation requirements of the wireless power receiver 100b as satisfying them would enable optimal operation of the wireless power receiver 100b.

As previously described in the detailed description, the wireless power transmitter 100a checks 405 for an input power source whose maximum available power satisfies the optimal operation requirement of the wireless power receiver 100b. The wireless power transmitter 100a communicates with the wireless power receiver 100b based on the identification. The wireless power transmitter 100a transmits 406 a "go ahead" message or symbol, when an input power source matching the optimal operation requirements of the wireless power receiver 100b is successfully identified. The "go ahead" message or symbol establishes 409 the power contract process and the wireless power receiver 100b starts drawing and delivering power to its load. If the input sources do not provide sufficient power to satisfy the wireless power receiver's 100b optimal operation requirement, then the wireless power transmitter 100a selects the input power source that is closest to satisfying the optimal operation requirement as described previously in the detailed description. The wireless power transmitter 100a sends an update info message to the wireless power receiver 100b containing the newly computed sub-optimal but stable operational power limits. On receiving the message, the wireless power receiver 100b as described previously in the detailed description, may compute the maximum amount of power that the wireless power receiver 100b can deliver to its load. The wireless power receiver 100b reconfigures 408 its power output circuitry to deliver power at or below this maximum output power limit. It also reconfigures any downstream active loads appropriately to not draw power in excess of this maximum output power limit. After reconfiguration, it sends an acknowledgement message to the wireless power transmitter 100a. On receiving the acknowledgement message, the wireless power transmitter 100a transmits 406 a "go ahead" message or symbol. The "go ahead" message or symbol establishes 409 the power contract process and the wireless power receiver 100b starts drawing and delivering power to its load.

For a period of time following the start of power transfer, the wireless power transmitter actively monitors for unstable power transfer behavior. Depending on various factors such as operating efficiency of the wireless power transmitter 100a and wireless power receiver 100b, positional alignment between the wireless power transmitter's transmit power interface and the wireless receiver's receive power interface, etc., the selected input power source may not yet be able to source sufficient power into the wireless power system 100 for the wireless power receiver 100b to deliver its configured maximum output power to its downstream passive or active load. This will result in unstable power transfer behavior. If there is an unstable power transfer behavior, the wireless power transmitter 100a suitably reduces its efficiency estimates in every pass to yield maximum output power limit and input power threshold values that are lower than those values computed and communicated in the previous pass. This way, if ever there were any unstable power transfer behavior, the wireless power transmitter 100a traps and eliminates such an unstable power transfer behavior right in the initial period of charging. The wireless power system overcomes unstable power transfer behavior by computing, configuring and fine-tuning a sustainable maximum output power limit of the wireless power receiver based on its appraisal of the maximum available power from the wireless power transmitter's input power sources.

In an embodiment, where the wireless power transmitter 100a has access to multiple power domains, for example, inside a computing device such as a laptop, the power appraiser circuit 109 of the wireless power transmitter 100a selects an appropriate input power source that allows stable power transfer to the wireless power receiver 100b. The stable and optimal power transfer allows for a good end user experience, as the stability of the power transfer directly impacts charging time, battery reliability, battery lifetime, etc.

In this wireless power system, the mode of wireless power transfer from the wireless power transmitter 100a to one or more wireless power receivers 100b may be inductive, capacitive or electromagnetic. The wireless power receivers 100b may be placed on top or in the vicinity of the wireless power transmitter 100a. When radio frequency (RF) spectrum such as that used for WiFi is utilized to transfer power wirelessly from the transmitter to the receiver, the wireless power receivers 100b may be atop, in the vicinity or significantly separated from the wireless power transmitter 100a. The wireless power system 100 aims to overcome unstable power transfer behavior between the wireless power transmitter 100a and one or more wireless power receivers 100b via various techniques such as input power source selection, constraining wireless power receiver 100b power output circuitry's power output to not exceed a maximum limit and by monitoring, computing and reconfiguring this maximum output power limit in the early period of power transfer to adjust for alignment conditions, operating efficiencies, etc.

During stable power transfer from the wireless power transmitter 100a to one or more wireless power receivers 100b, one or more wireless power receivers 100b may be placed within or removed from the charging zone of the wireless power transmitter 100a. As disclosed herein, charging zone is the area in the vicinity of wireless power transmitter 100a within which wireless power receiver 100b if placed, can wirelessly receive power from this wireless power transmitter 100a. Removal of one or more wireless power receivers 100b from the charging zone of the wireless power transmitter 100a would make available more of the power from the input power source to the wireless power receivers 100b that are still in the charging zone. For example, if the input power source has a maximum power availability of 10 W and if it distributes that power equally to two wireless power receivers 100b that are in the charging zone, then when one of the wireless power receivers 100b is removed from the charging zone, the full 10 W of power from the input source can now be made available to the wireless power receiver 100b that is still in the charging zone. In the wireless power system disclosed herein, the wireless power transmitter 100a senses the removal of one or more wireless power receivers 100b from the charging zone, recalculates the power distribution among the wireless power receivers 100b that are in the charging zone and sends information message to them for the wireless power receivers 100b to update their respective maximum output power limits. As a result, the wireless power receiver 100b can deliver more power to the load if the load so requires. As the maximum output power limits are being increased, it is not necessary to halt the power transfer even temporarily.

Addition of one or more wireless power receivers 100b into the charging zone of the wireless power transmitter 100a would make available less of the power from the input source to the wireless power receivers 100b that were already in the charging zone. For example, if the input source has a maximum power availability of 10 W and if it is providing that power to one wireless power receiver 100b that is in the charging zone, then when a second wireless power receiver 100b is placed inside the charging zone of wireless power transmitter 100a, the full 10 W of power from the input source has to be shared by both wireless power receivers 100b and will not be available entirely to the first wireless power receiver 100b. If the load of this first wireless power receiver 100b was drawing power at the configured maximum power limit, then in all likelihood, on the addition of the second wireless power receiver 100b into the charging zone, the first wireless power receiver 100b will no longer be able to deliver the power drawn by its load. This causes instability of power transfer between the wireless power transmitter 100a and the wireless power receivers 100b.

In the wireless power system disclosed herein, the wireless power transmitter 100a senses the insertion of one or more wireless power receivers 100b into the charging zone. It then takes suitable action to ensure that the stability of power transfer remains uncompromised. In the first embodiment, the wireless power transmitter 100a does not allocate all the available power from the input source to the one or more wireless power receivers 100b that are currently being charged. It retains a small amount of power and provides this retained power to the newly added one or more wireless power receivers 100b only. With this small amount of power, the newly added wireless power receivers 100b can power up and communicate their needs to the wireless power transmitter 100a without affecting the ongoing power transfer to other previously placed wireless power receivers 100b. With awareness of the maximum available power from the input source and the maximum required power from each of the wireless power receivers 100b, the wireless power transmitter 100a recalculates the power distribution configuration among the wireless power receivers 100b in the charging zone. The wireless power transmitter 100a sends a "renegotiate" message to the wireless power receivers 100b that are in the charging zone causing them to interrupt their power transfer to their loads. These wireless power receivers 100b will then share their information again and renegotiate new power transfer contracts with the wireless power transmitter 100a. Based on the recomputed power distribution configuration, the wireless power transmitter 100a sends information message to the wireless power receivers 100b and the wireless power receivers 100b configure their maximum power output limit to align with this new redistributed power configuration.

In a second embodiment, the wireless power transmitter 100*a* has allocated all the available power from the input power source to the one or more wireless power receivers 100*b* that are currently being charged so when the wireless power transmitter 100*a* senses the insertion of additional wireless power receivers 100*b* into the charging zone, it momentarily terminates the power transfer to all the wireless power receivers 100*b*. The stop and restart of power causes the wireless power receivers 100*b* to reset, interrupt their power transfer to their respective loads, share their information again and renegotiate new power transfer contracts with the wireless power transmitter 100*a*. With awareness of the maximum available power from the input source and the maximum required power from each of the wireless power receivers 100*b*, the wireless power transmitter 100*a* recalculates the power distribution configuration among the wireless power receivers 100*b* in the charging zone. The wireless power transmitter 100*a* then sends information message to the wireless power receivers 100*b* and the wireless power receivers 100*b* configure their maximum power output limit to align with this new redistributed power configuration.

In a third embodiment, when the wireless power transmitter 100*a* senses the insertion of one or more wireless power receivers 100*b* into the charging zone, upon realizing that the power transfer will become unstable, the wireless power transmitter 100*a* sends a "renegotiate" message to the wireless power receivers 100*b* that were already in the charging zone causing them to interrupt their power transfer to their loads. These wireless power receivers 100*b* will then share their information again and renegotiate new power transfer contracts with the wireless power transmitter 100*a*. With awareness of the maximum available power from the input source and the maximum required power from each of the wireless power receivers 100*b*, the wireless power transmitter 100*a* recalculates the power distribution configuration among the wireless power receivers 100*b* in the charging zone. The wireless power transmitter 100*a* then sends information message to the wireless power receiver 100*b* and the wireless power receivers 100*b* configure their maximum power output limit to align with this new redistributed power configuration.

In a fourth embodiment, when the wireless power transmitter 100*a* senses the insertion of one or more wireless power receivers 100*b* into the charging zone, the wireless power transmitter 100*a* opportunistically provides the required power to the newly added wireless power receivers 100*b*. Based on their current power delivery, the previously placed wireless power receivers 100*b* may notice immediately or in due course of time, a drop in the negotiated guaranteed maximum power delivery. The inability to deliver at the negotiated guaranteed maximum power delivery leads to instability so wireless power receiver 100*b* sends renegotiation messages to the wireless power transmitter 100*a*. As explained, the wireless power transmitter 100*a* recalculates the power distribution configuration among the wireless power receivers 100*b* in the charging zone. The wireless power transmitter 100*a* then sends information message to the wireless power receiver 100*b*. Based on these messages, the wireless power receiver 100*b* reconfigures its maximum output power limit leading to stable power transfer to its load. In an embodiment of the above, wireless power receiver 100*b* monitors other vital operating parameters such as the external interface surface temperature, internal regulator temperature, etc. If any of these operating parameters were to cross their safe limits, the wireless power receiver 100*b* uses the same mechanism to renegotiate the power transfer contract with the wireless power transmitter 100*a* to help ensure that the power transfer is stable within prescribed safety operating limits.

When one or more wireless power receiver's 100*b* are added to the charging zone, the wireless power transmitter 100*a* may partition and distribute the available power from the input power source amongst the wireless power receivers in accordance with different criteria. In the first embodiment, the available power may be distributed equally amongst the wireless power receivers. In the second embodiment, the available power may be distributed in proportion to the wireless power receiver's 100*b* respective maximum output power limit or other such wireless power receiver based generic criteria. In a third embodiment, the wireless power transmitter 100*a* may choose to provide maximum power to one or a few select wireless power receivers 100*b* while starving other wireless power receivers 100*b* of any power delivery to their respective load. For example, if a wireless power receiver 100*b* is added to the charging zone of a wireless power transmitter 100*a* that can provide a maximum of 10 W of power, the wireless power transmitter 100*a* may choose to provide the full 10 W to this new wireless power receiver 100*b* while reconfiguring the previously charging wireless power receivers 100*b* to not deliver any power (0 W) to their respective loads. The criteria for power distribution may be fixed or dynamic based on time of day, user credentials, etc. In the wireless power system disclosed herein, the wireless power transmitter 100*a* flexibly partitions and distributes the available power from the input power source to one or more wireless power receivers 100*b* that are placed in its charging zone based on a fixed or a dynamic algorithm.

In an embodiment of the wireless power system disclosed herein, the wireless power transmitter 100*a* negotiates a new amount of available power from the input power source to accommodate the needs of one or more wireless power receivers 100*b* that are placed in the wireless power transmitter's 100*a* charging zone. When one or more wireless power receivers 100*b* are inserted into the charging zone, more input power is required to satisfy their needs so the wireless power transmitter 100*a* negotiates for a higher amount of available power from the input power source. When one or more wireless power receivers 100*b* are removed from the charging zone, reduced amount of input power is required to satisfy the needs of the one or more wireless power receivers 100*b* that are still in the charging zone so the wireless power transmitter 100*a* negotiates for a lower amount of available power from the input power source. The wireless power transmitter 100*a* may exchange messages with one or more input power source via industry standard protocol such as the Universal Serial Bus Protocol Power Delivery (USB PD) specification or via proprietary protocols such as the Qualcomm Quick Charge protocol, Samsung Fast Charge protocol, etc. Negotiating via such a protocol, the wireless power transmitter 100*a* can increase or decrease the amount of available power provided by the input power source so as to satisfy the needs of the wireless power receivers 100*b* that are situated in its charging zone.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein;

rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A wireless power transmitter operatively connected to an input power source, said wireless power transmitter configured to deliver power from said input power source wirelessly to wireless power receiver(s), wherein the number of wireless power receivers that are within its charging zone at one time varies,
    said wireless power transmitter including a detection unit, said detection unit configured to sense:
        insertion of said wireless power receiver(s) into the charging zone, and
        removal of said wireless power receiver(s) from the charging zone,
    wherein said wireless power transmitter performs the following:
        on sensing the insertion of first placed wireless power receiver(s) into the charging zone, said wireless power transmitter exchanges messages with the wireless power receiver(s), negotiating an initial power transfer contract which defines the minimum and maximum power necessary to ensure stable power delivery from the wireless power receiver(s) to its respective load,
        said wireless power transmitter configures its wireless power transmission to ensure that said delivery of power to the load of the wireless power receiver(s) is stable, and
        on sensing the insertion of one or more additional newly placed wireless power receivers into the charging zone, said wireless power transmitter sends messages to said wireless power receivers that are in the charging zone to update their circuitry to ensure said delivery of power to their respective load is stable, said wireless power transmitter adjusts its wireless power transmission to ensure that said delivery of power to the respective load of all said wireless power receivers that are within the charging zone is stable,
        said wireless power transmitter adjusts its wireless power transmission to ensure that said delivery of power to the respective load of all said wireless power receivers that are within the charging zone is stable, and
        on sensing the removal of one or more said wireless power receivers from the charging zone, said wireless power transmitter sends messages to said wireless power receiver(s) that are still within the charging zone to update their circuitry to ensure said delivery of power to their respective load is stable, said wireless power transmitter adjust its wireless power transmission to ensure that said delivery of power to the respective load of all said wireless power receiver(s) that are still within the charging zone is stable.

2. The wireless power transmitter of claim 1, wherein said wireless power transmitter partitions and distributes the available power from the input power source to one or more said wireless power receivers that are within it's charging zone based on one of a fixed algorithm and a dynamic algorithm.

3. The wireless power transmitter of claim 1, wherein said wireless power transmitter negotiates a new amount of available power from said input power source to accommodate the needs of one or more said wireless power receivers that are in said wireless power transmitter's charging zone.

4. A wireless power receiver configured to receive power wirelessly from a wireless power transmitter when placed in said wireless power transmitter's charging zone, said wireless power receiver configured to deliver said received power to its load,
    said wireless power receiver negotiating with said wireless power transmitter an initial power transfer contract which defines the minimum and maximum power to ensure stable power delivery to its said load,
    said wireless power receiver on detection of violation of one of stable power delivery to its said load and of safety limits of its operating parameters while receiving power from said wireless power transmitter in whose charging zone said wireless power receiver has been placed in, said wireless power receiver, exchanges messages with said wireless power transmitter to renegotiate a new power transfer contract based on which said wireless power receiver updates its circuitry to ensure that said delivery of power to its said load is stable and its operating parameters are within the safety limits.

5. The wireless power receiver of claim 4, wherein said wireless power receiver senses violation of guaranteed maximum power delivery to its load that said wireless power receiver had previously negotiated as part of said power transfer contract with said wireless power transmitter in whose charging zone said wireless power receiver has been placed in, said wireless power receiver exchanges messages with said wireless power transmitter to renegotiate a new said guaranteed maximum power delivery as part of an updated said power transfer contract based on which said wireless power receiver updates its circuitry to ensure that said delivery of power to its load is stable.

6. A method for maintaining stability of power transfer from a wireless power transmitter when delivering power wirelessly to the loads of wireless power receivers, wherein the number of wireless power receivers that are within the charging zone of the wireless power transmitter at one time varies,
    said wireless power transmitter including a detection unit, said detection unit configured to sense:
        insertion of said wireless power receivers into the charging zone, and
        removal of said wireless power receivers from the charging zone,
    said wireless power transmitter performing the following:
        on sensing the insertion of first placed wireless power receiver(s) into the charging area, said wireless power transmitter exchanges messages with the wireless power receiver(s), negotiating an initial power transfer contract which defines the minimum and maximum power necessary to ensure stable power delivery from the first placed wireless power receiver(s) to its respective load,
        and
        on sensing insertion of one or more additional wireless power receivers newly placed into the charging zone, said wireless power transmitter,
            receiving messages from the newly placed additional wireless power receivers, recalculating the power distribution configuration among said wireless power receivers that are in the charging zone, based on the recalculated power distribution configuration, negotiating a power transfer contract with each newly placed additional wireless power receivers which defines the minimum and maximum power to ensure stable power delivery from the one or more newly placed additional wireless power receivers to their respective load, sending a renegotiate message to one or more said wireless power receivers that were previously placed in the charging zone, based on the recalculated power distribution configuration, negotiating a new power transfer contract with each previously placed said wireless power receivers which defines the minimum and maximum power to ensure stable power delivery from said wireless power receivers that were previously placed in the charging zone to their respective load, sending messages to all said wireless power receivers that are in the charging zone to update their circuitry to ensure said delivery of power to their respective load is stable and performing power transmission in accordance with the recalculated power distribution;

or on sensing insertion of one or more said wireless power receivers newly placed into the charging zone, said wireless power transmitter, momentarily terminating said power delivery to all said wireless power receivers that are in the charging zone thereby interrupting previously placed said wireless power receivers's power delivery to their respective load, restarting a minimal power transfer to said wireless power receivers that are in the charging zone necessary to support communication, receiving various information from said wireless power receivers in the charging zone, recalculating the power distribution configuration, based on the recalculating the power distribution configuration, negotiating a new power transfer contract with all said wireless power receivers that are in the charging zone which defines the minimum and maximum power to ensure stable power delivery from said wireless power receivers in the charging zone to their respective load, sending messages to all said wireless power receivers that are in the charging zone to update their circuitry to ensure said delivery of power to their respective load is stable and performing power transmission in accordance with the recalculated power distribution;

or on sensing insertion of one or more said wireless power receivers newly placed into the charging zone, said wireless power transmitter, receiving messages from said wireless power receivers newly placed in the charging zone, sending a renegotiate message to said wireless power receivers that were previously placed in the charging zone, receiving various information from previously placed said wireless power receivers, recalculating the power distribution configuration among said wireless power receivers that are in the charging zone, based on the recalculating the power distribution configuration, negotiating a new power transfer contract with all said wireless power receivers that are in the charging zone which defines the minimum and maximum power to ensure stable power delivery from said wireless power receivers in the charging zone to their respective load, sending messages to all said wireless power receivers that are in the charging zone to update their circuitry to ensure said delivery of power to their respective load is stable and performing power transmission in accordance with the recalculated power distribution;

and on sensing removal of one or more said wireless power receivers from the charging zone, said wireless power transmitter, recalculating the power distribution configuration among said wireless power receivers that are still in the charging zone, based on the recalculating power distribution configuration, negotiating with said wireless power that are still in the charging zone a new power transfer contract which defines the minimum and maximum power to ensure stable power delivery from said wireless power receivers that are still in the charging zone to their respective load, sending messages to said wireless power receivers that are still in the charging zone to update their circuitry to ensure that said delivery of power to their respective load is stable and performing power transmission in accordance with the recalculated power distribution.

* * * * *